US010645862B2

(12) United States Patent
Winick et al.

(10) Patent No.: US 10,645,862 B2
(45) Date of Patent: May 12, 2020

(54) ROW CLEANER FINGER WHEEL

(71) Applicants: Allan E. Winick, Wellington, CO (US); Jerry L. Groff, Imperial, NE (US)

(72) Inventors: Allan E. Winick, Wellington, CO (US); Jerry L. Groff, Imperial, NE (US)

( * ) Notice: Subject to any disclaimer, the term of this patent is extended or adjusted under 35 U.S.C. 154(b) by 100 days.

(21) Appl. No.: 16/052,782

(22) Filed: Aug. 2, 2018

(65) Prior Publication Data
US 2019/0075713 A1    Mar. 14, 2019

Related U.S. Application Data

(60) Provisional application No. 62/556,028, filed on Sep. 8, 2017.

(51) Int. Cl.
*A01C 5/06*     (2006.01)
*A01C 7/00*     (2006.01)

(52) U.S. Cl.
CPC .............. *A01C 5/064* (2013.01); *A01C 7/006* (2013.01)

(58) Field of Classification Search
CPC ......... A01C 5/064; A01C 5/066; A01C 7/006; A01B 35/16; A01B 35/28; A01B 21/08
USPC ................................. 172/540, 555, 557, 604
See application file for complete search history.

(56) References Cited

U.S. PATENT DOCUMENTS

| | | | | |
|---|---|---|---|---|
| 494,248 A | * | 3/1893 | Cady | A01B 33/103 172/540 |
| 601,712 A | * | 4/1898 | Lamb | B02C 1/10 241/291 |
| 1,845,936 A | * | 2/1932 | Rude | A01B 35/28 172/556 |
| 3,435,904 A | * | 4/1969 | Rice | A01B 21/02 172/556 |
| 3,690,385 A | * | 9/1972 | Weiss | A01B 23/06 172/604 |
| 3,766,988 A | | 10/1973 | Whitesides | |
| 4,469,185 A | * | 9/1984 | Fox et al. | A01C 5/064 172/120 |
| 5,346,020 A | | 9/1994 | Bassett | |
| 6,776,107 B1 | | 8/2004 | Shoup | |
| 7,240,627 B1 | | 7/2007 | Whalen et al. | |
| 7,832,345 B2 | | 11/2010 | Whalen et al. | |
| 8,596,375 B2 | | 12/2013 | Winick et al. | |
| 8,826,836 B2 | | 9/2014 | Van Buskirk et al. | |
| 9,307,690 B2 | | 4/2016 | Bassett | |
| 2009/0321096 A1 | * | 12/2009 | Winick et al. | A01C 5/064 172/556 |
| 2017/0000001 A1 | | 1/2017 | Freed et al. | |

* cited by examiner

*Primary Examiner* — Tara Mayo-Pinnock
(74) *Attorney, Agent, or Firm* — Ancel W. Lewis, Jr.; Cochran Freund & Young LLC

(57) ABSTRACT

A finger wheel for a row cleaner has multiple, spaced, radially extending fingers. Each finger has a concave forward edge with inner and outer sections, and a convex rearward edge with inner and outer sections. The outer sections of the forward and rearward edges converge to a point. A curved connecting section connects the forward edge of one finger to the rearward edge of the next finger.

9 Claims, 1 Drawing Sheet

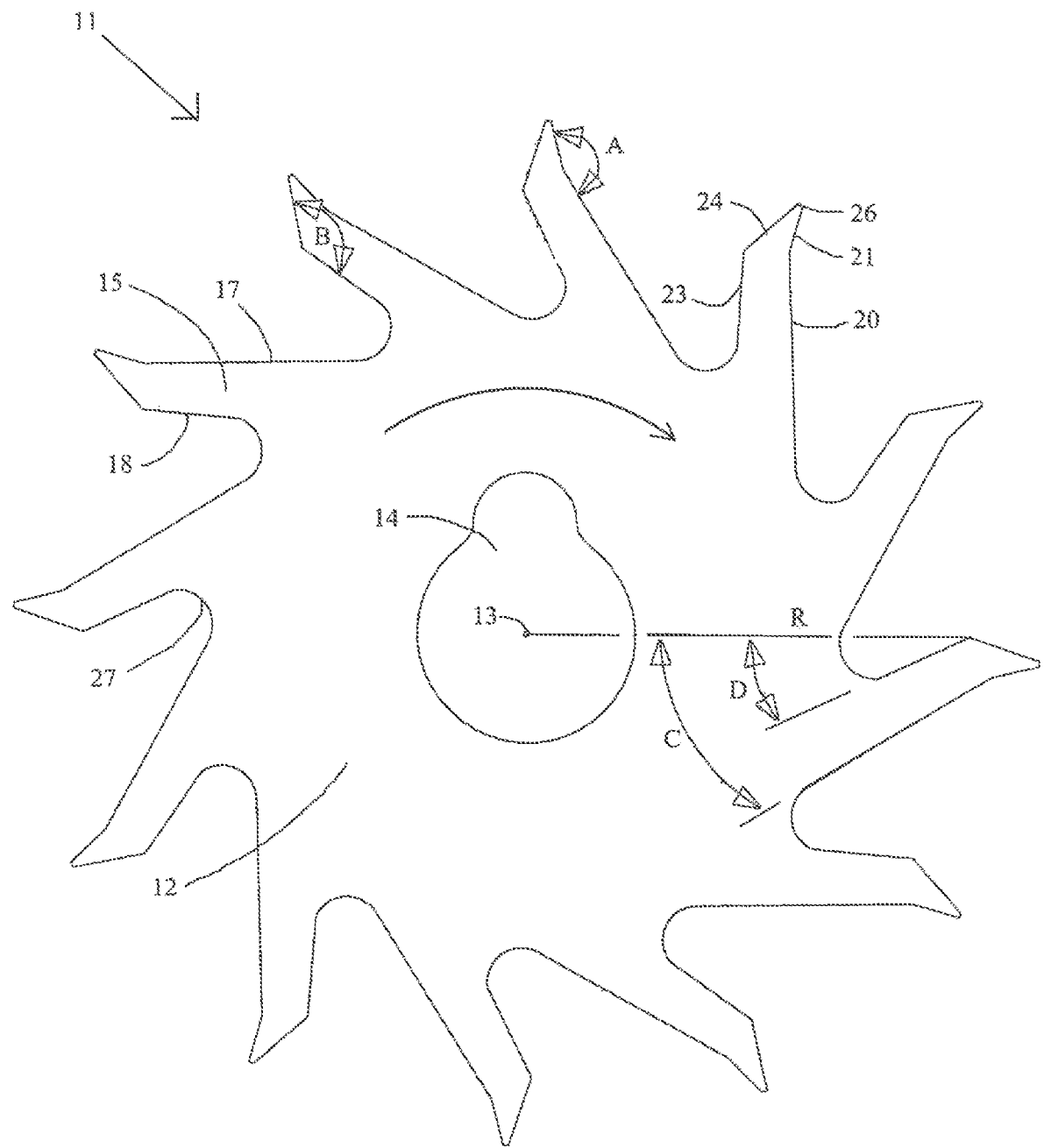

ROW CLEANER FINGER WHEEL

TECHNICAL FIELD

The present invention relates to agriculture, and more particularly to a finger wheel for a row cleaner.

BACKGROUND ART

Fertilizing and planting at precise depths increases crop yields. Row cleaners clean the row line in front of fertilizing and/or planting apparatus to allow precise depth control. A row cleaner generally has a finger wheel mount, a pair of hubs mounted on the wheel mount and a finger wheel mounted on each hub.

U.S. Pat. No. 5,497,836 to Groff discloses a row cleaner with finger wheels that angle inwardly and forwardly. U.S. Pat. No. 8,596,375 to Winick et al. discloses a row cleaner with concave finger wheels that are spaced along the direction of travel, that angle inwardly and forwardly, and that angle inwardly and downwardly. The row cleaners of Groff and Winick et al. provide improved row cleaning.

DISCLOSURE OF THE INVENTION

A finger wheel for a row cleaner has a flat circular central disc portion and a plurality of circumferentially spaced, flat, radially projecting fingers. Each finger includes a forward edge and a rearward edge. The forward edge has an inner section and an outer section the extends outwardly and forwardly from the inner section, such that the forward edge is concave. The rearward edge has a inner section and an outer section the extends outwardly and forwardly from the inner section, such that the rearward edge is convex. The outer sections of the forward and rearward edges intersect at a point. A curved connecting section connects the inner section of the rearward edge of one finger with the inner section of the forward edge of the next finger.

BRIEF DESCRIPTION OF THE DRAWINGS

Details of this invention are described in connection with the accompanying drawing that bears similar reference numerals in which:

The FIGURE is a side elevation view of a finger wheel embodying features of the present invention.

DETAILED DESCRIPTION OF THE INVENTION

Referring to the FIGURE, a finger wheel 11 for a row cleaner embodying feature of the present invention has a flat circular central disc portion 12 with a center 13 and a center mounting aperture 14 for mounting the finger wheel 11 on a hub, and a plurality of flat, circumferentially spaced fingers 15 projecting radially from and coplanar with the disc portion 12. The finger wheel 11 shown has twelve fingers 15 spaced at 30 degrees per finger 15. By way of example, and not as a limitation, the finger wheel 11 may have a radius of about 6.875 inches and the mounting aperture 14 may have a radius of about 1.462 inches.

Describing the specific embodiments herein chosen for illustrating the invention, certain terminology is used which will be recognized as being employed for convenience and having no limiting significance. For example, the terms "forward", and "rearward" will refer to the illustrated embodiment in its normal direction of travel. Further, all of the terminology above-defined includes derivatives of the word specifically mentioned and words of similar import.

Each finger 15 includes a forward edge 17 and a spaced rearward edge 18. The forward edge 17 has an outwardly extending, substantially straight inner section 20 and a substantially straight outer section 21 that extends outwardly and forwardly relative to the inner section 20 at a selected obtuse first angle A, such that the forward edge 17 is concave. The rearward edge 18 has an outwardly extending, substantially straight inner section 23 and a substantially straight outer section 24 that extends outwardly and forwardly relative to the inner section 23 at a selected obtuse second angle B, such that the rearward edge 18 is convex.

The inner section 20 of the forward edge 17 extends outwardly and rearwardly at a selected third angle C relative to a radial line R from the center 13 of the disc portion 12 to the intersection of the inner and outer sections 23 and 24 of the rearward edge 18. The inner section 23 of the rearward edge 18 extends outwardly and rearwardly at a selected fourth angle D relative to the line R.

The third angle C is slightly greater than the fourth angle D so that the inner sections 20 and 23 of the forward and rearward edges 17 and 18 are converging. The first angle A is greater than the second angle B so that the outer sections 21 and 24 of the forward and rearward edges 17 and 18 converge at a point 26. A concave curved connecting section 27 connects the inner end of the inner section 20 of the forward edge 17 on one finger 15 to the inner end of the inner section 23 of the rearward edge 18 of the next finger 15.

On the finger wheel 11 shown the first angle is about 162.822 degrees, the second angle is about 136.132 degrees, the third angle is about 31.022 degrees and the fourth angle is about 25 degrees, so that the inner sections 20 and 23 of the forward and rearward edges 17 and 18 converge at about 6.022 degrees and the outer sections 21 and 24 of the forward and rearward edges 17 and 18 converge to point 26 at about 32.712 degrees. The outer section 21 of the forward edge 17 extends outwardly and rearwardly at about 13.844 degrees and the outer section 24 of the rearward edge 18 extends outwardly and forwardly at about 18.868 degrees, relative to the radial line R. On the finger wheel 11 shown the length of the inner section 20 of the forward edge 17 is about 2.864 inches, the length of the outer section 21 of the forward edge 17 is about 0.645 inches, the length of the inner section 23 of the rearward edge 18 is about 1.33 inches, the length of the outer section 24 of the rearward edge 18 is about 0.974 inches, and the radius of the connecting section 27 is about 0.465 inches. The finger wheel 11 is more aggressive than prior known finger wheels and provides improved row cleaning.

Although the present invention has been described with a certain degree of particularity, it is understood that the present disclosure has been made by way of example and that changes in details of structure may be made without departing from the spirit thereof.

What is claimed is:

1. A finger wheel for a row cleaner comprising:
   a flat circular central disc portion having a center and a center mounting aperture for mounting said disc portion on a hub,
   a plurality of flat, circumferentially spaced fingers projecting radially from and coplanar with said disc portion, each said finger including a forward edge and a spaced rearward edge, said forward edge having an outwardly extending, substantially straight inner section and a substantially straight outer section that extends outwardly and forwardly from said inner section at a selected obtuse first angle, such that said forward edge is concave, said rearward edge having an outwardly extending, substantially straight inner section and a substantially straight outer section that extends outwardly and forwardly from said inner section at a selected obtuse second angle, such that said rearward edge is convex, said inner section of said forward edge extending outwardly and rearwardly at a selected third angle relative to a radial line from said center to the intersection of said inner and outer sections of said rearward edge, said inner section of said rearward edge extending outwardly and rearwardly at a selected fourth angle relative to said radial line, with said outer sections of said forward and rearward edges converging to a point, and concave curved connecting sections connecting said inner section of said forward edge of each finger to said inner section of said rearward edge of the adjacent finger.

2. The finger wheel as set forth in claim 1 wherein said outer section of said forward edge extends outwardly and rearwardly and said outer section of said rearward edge extends outwardly and forwardly, relative to said radial line.

3. The finger wheel as set forth in claim 2 wherein said outer section of said forward edge extends outwardly and rearwardly at about 14 degrees and said outer section of said rearward edge extends outwardly and forwardly at about 19 degrees, relative to said radial line.

4. The finger wheel as set forth in claim 2 wherein said outer sections of said forward and rearward edges converge to said point at about 33 degrees.

5. The finger wheel as set forth in claim 1 wherein said third angle is slightly greater than said fourth angle so that said inner sections of said forward and rearward edges are converging.

6. The finger wheel as set forth in claim 5 wherein said third angle is about 31 degrees and said fourth angle is about 25 degrees.

7. The finger wheel as set forth in claim 5 wherein said third angle is about 6 degrees greater than said fourth angle.

8. The finger wheel as set forth in claim 1 wherein said first angle is about 163 degrees and said second angle is about 136 degrees.

9. A finger wheel for a row cleaner comprising:

a flat circular central disc portion having a center and a center mounting aperture for mounting said disc portion on a hub, a plurality of flat, circumferentially spaced fingers projecting radially from and coplanar with said disc portion, each said finger including a forward edge and a spaced rearward edge, said forward edge having an outwardly extending, substantially straight inner section and a substantially straight outer section that extends outwardly and forwardly from said inner section at a selected obtuse first angle, such that said forward edge is concave, said rearward edge having an outwardly extending, substantially straight inner section and a substantially straight outer section that extends outwardly and forwardly from said inner section at a selected obtuse second angle, such that said rearward edge is convex, said inner section of said forward edge extending outwardly and rearwardly at a selected third angle relative to a radial line from said center to the intersection of said inner and outer sections of said rearward edge, said inner section of said rearward edge extending outwardly and rearwardly at a selected fourth angle relative to said radial line, with said outer sections of said forward and rearward edges converging to a point, said outer section of said forward edge extending outwardly and rearwardly and said outer section of said rearward edge extending outwardly and forwardly, relative to said radial line, said third angle being slightly greater than said fourth angle so that said inner sections of said forward and rearward edges are converging, and concave curved connecting sections connecting said inner section of said forward edge of each finger to said inner section of said rearward edge of the adjacent finger.

* * * * *